US005702007A

United States Patent [19]

Fritz et al.

[11] Patent Number: 5,702,007
[45] Date of Patent: Dec. 30, 1997

[54] RACK ESPECIALLY ADAPTED FOR USE WITH BICYCLES

[76] Inventors: Gregory G. Fritz, 1075 Uncochief Cir., Steamboat Springs, Colo. 80477; Donald J. Patterson, 30 Highland Dr., Steamboat Springs, Colo. 80488

[21] Appl. No.: 382,619

[22] Filed: Feb. 2, 1995

[51] Int. Cl.$^6$ ................................................ B62H 3/08
[52] U.S. Cl. ............................ 211/17; 211/18; 211/19; 211/20
[58] Field of Search .......................... 211/17, 18, 19, 211/20, 23, 94, 194; D12/115; 206/335, 518, 519

[56] References Cited

U.S. PATENT DOCUMENTS

| | | | |
|---|---|---|---|
| D. 260,248 | 8/1981 | Gallagher | D12/115 |
| D. 298,524 | 11/1988 | De Luca | D12/115 |
| 446,835 | 2/1891 | Kennedy. | |
| 565,057 | 8/1896 | Westphal | 211/20 X |
| 605,628 | 6/1898 | Bradley. | |
| 731,651 | 6/1903 | Allen. | |
| 2,891,695 | 6/1959 | Peters | 206/518 |
| 3,603,459 | 9/1971 | Erb | 211/20 |
| 3,785,517 | 1/1974 | Brajkovich | 211/17 |
| 4,015,718 | 4/1977 | Bernard | 211/20 X |
| 4,102,468 | 7/1978 | Goldman | 206/518 X |
| 4,155,459 | 5/1979 | Marschak | 211/94 X |
| 4,352,432 | 10/1982 | Smith | 211/19 |
| 4,662,617 | 5/1987 | Ditterline, Jr. et al. | 269/16 |
| 5,078,277 | 1/1992 | Tschritter | 211/20 |
| 5,246,120 | 9/1993 | Walker | 211/19 |
| 5,267,657 | 12/1993 | McGuiness et al. | 211/17 X |
| 5,314,152 | 5/1994 | Troy et al. | 211/194 X |

FOREIGN PATENT DOCUMENTS 1315617 of 1962 France ............................ 211/18

*Primary Examiner*—Leslie A. Braun
*Assistant Examiner*—Donald J. Wallace
*Attorney, Agent, or Firm*—Luke Santangelo

[57] ABSTRACT

A generally L-shaped bicycle rack includes upper and lower intersecting leg portions, each including side walls having outwardly extending peripheral flanges which may optionally engage nails or screws for the purpose of securing the rack in a selected location. An arcuate well disposed centrally in the rack receives an outer circumferential portion of a bicycle wheel to support a bicycle for storage purposes. Aligned pairs of notches in the peripheral flanges of the upper and lower legs allows one or more of the racks to be secured in a variety of different mounting configurations. In a first alternative, the rack may be secured to a vertical wall to store a bicycle in a vertical orientation. In a second alternative, a plurality of racks may be secured in sequential adjacent relation to form a rack for storing multiple bicycles. A tubular member extending transversely through the upper leg of the rack may receive cables or chains for locking a bicycle to the rack. Alternatively, one or more of the racks may be mounted in a selected location by passing a chain, cable, or pipe through the tubular member. The rack has a lightweight open hollow construction which allows storage and shipping of a plurality of racks in nested stacked relation to minimize shipping and storage costs.

7 Claims, 5 Drawing Sheets

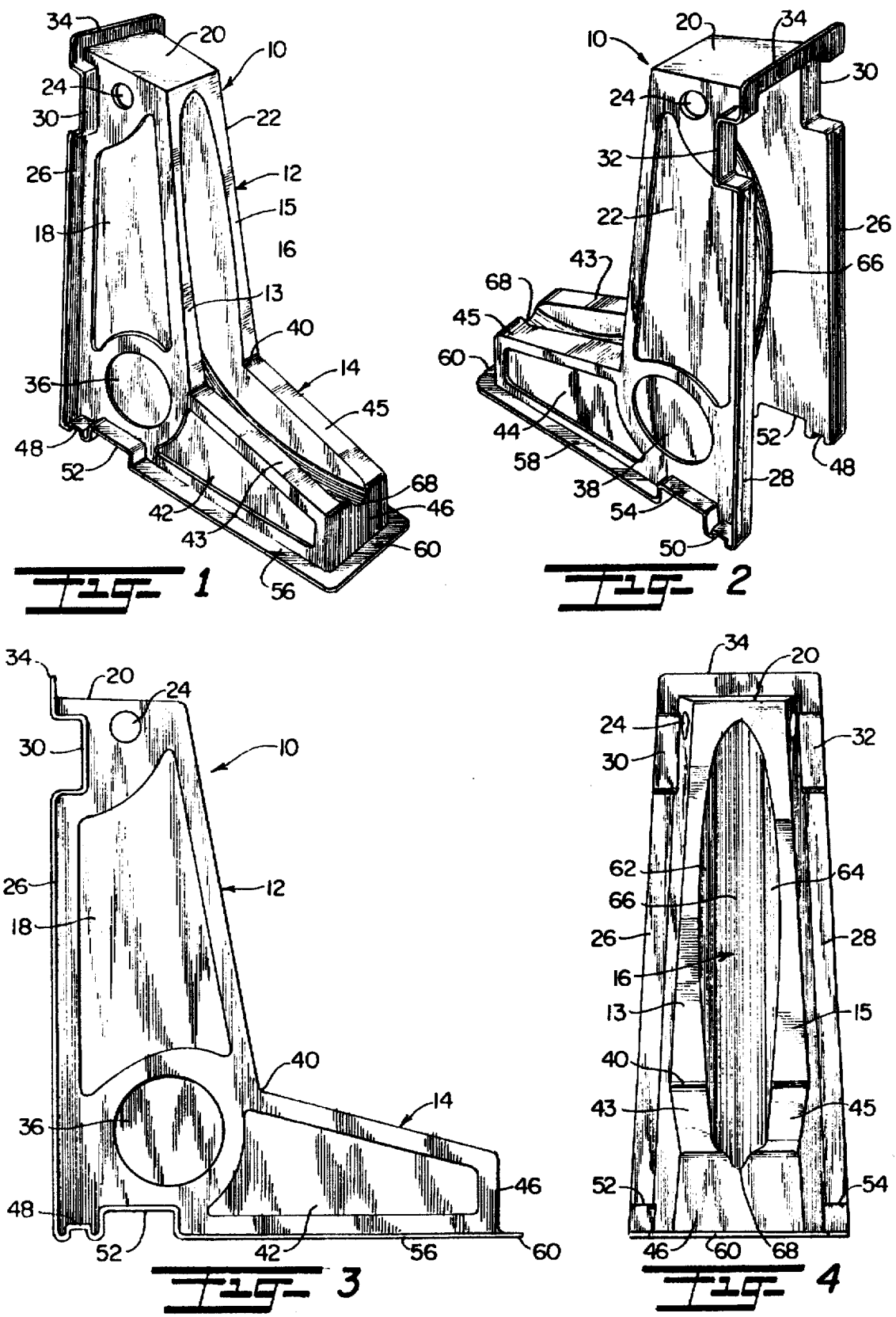

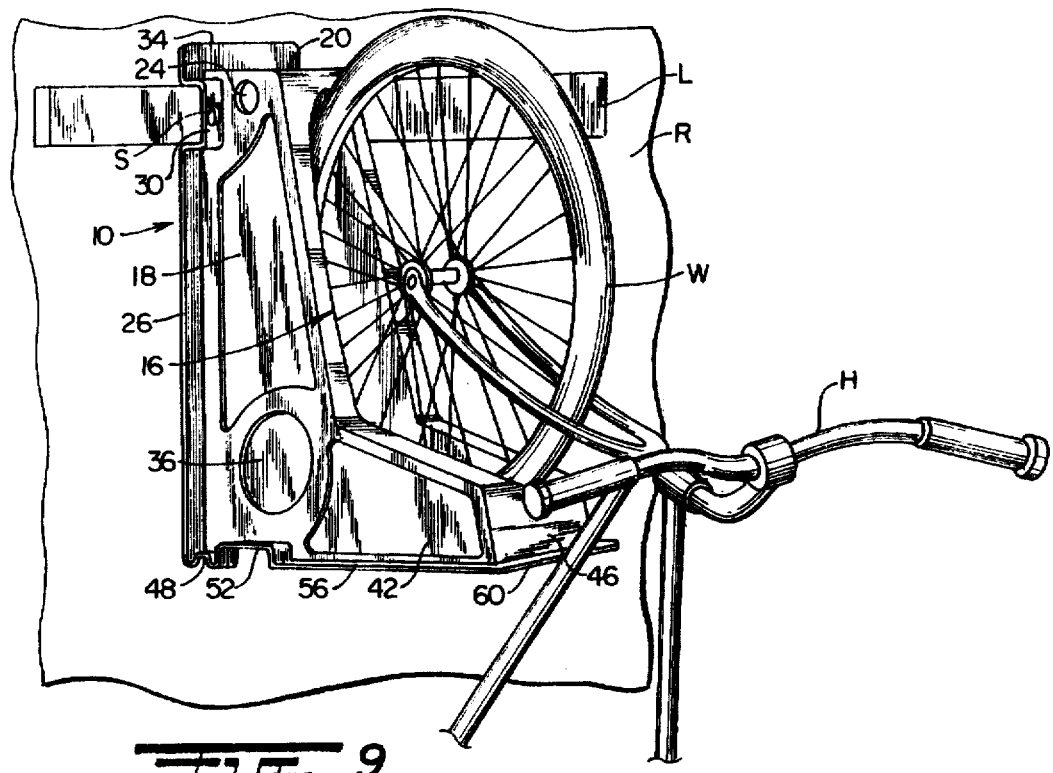
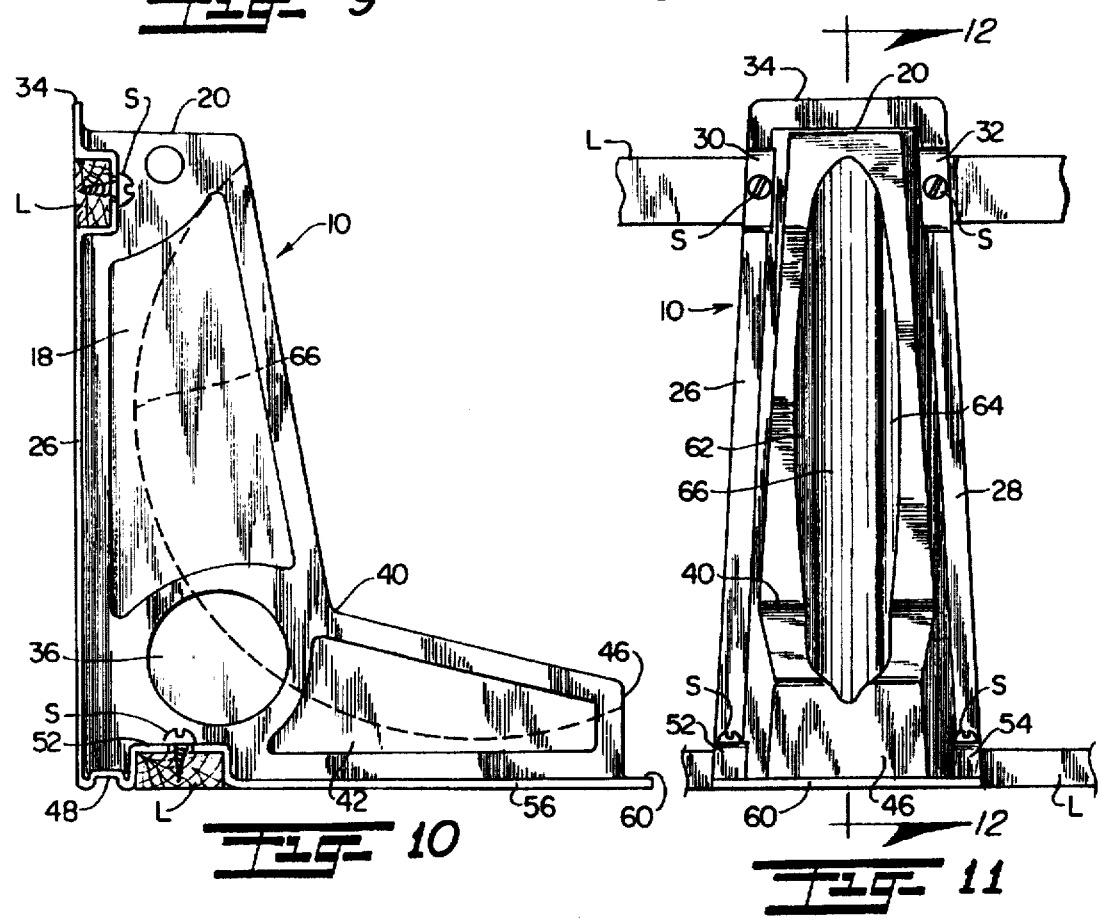

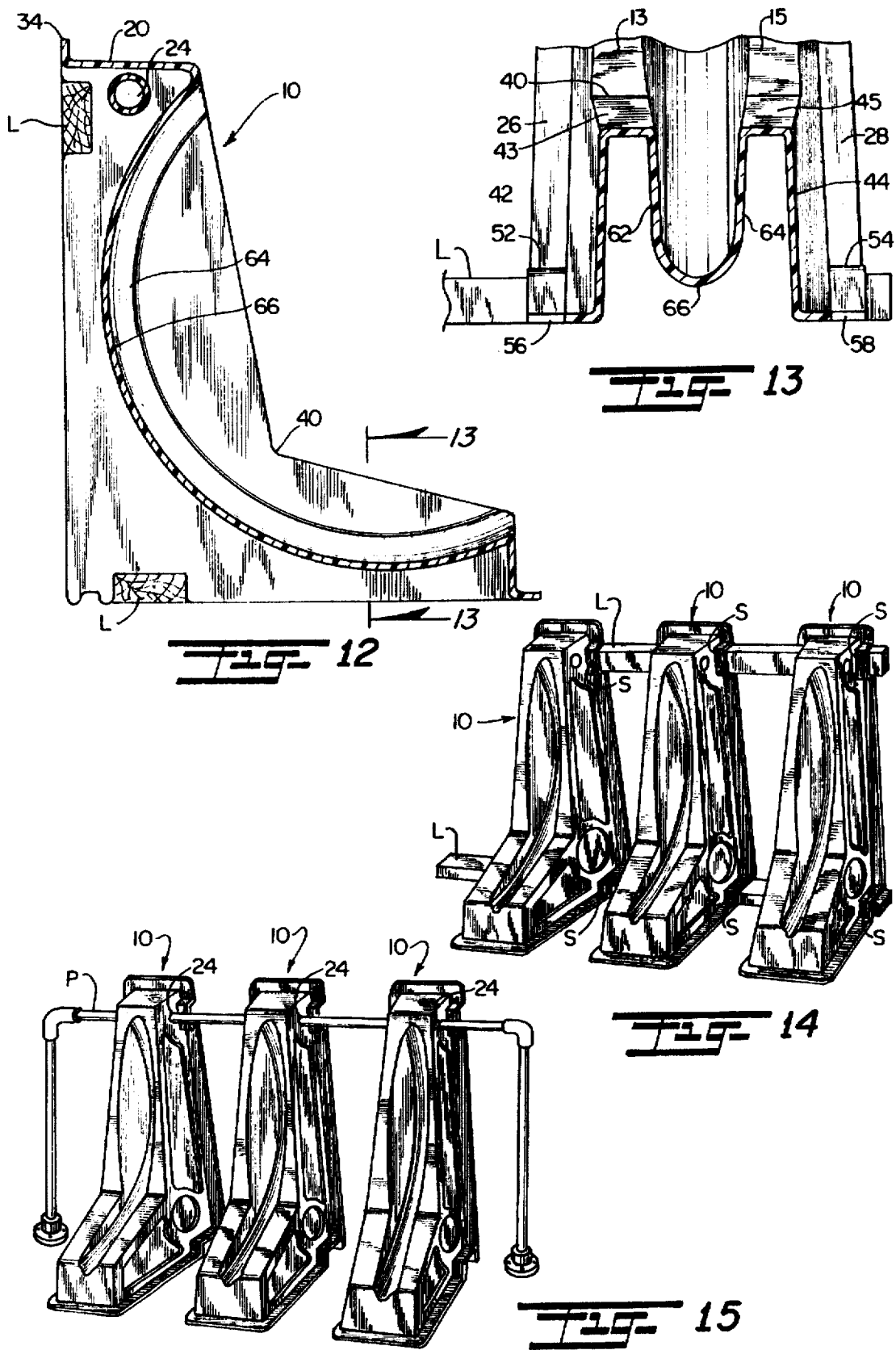

RACK ESPECIALLY ADAPTED FOR USE WITH BICYCLES

BACKGROUND OF THE INVENTION

1. Field of the Invention

The present invention relates to bicycle racks, and more particularly pertains to a new and improved rack for supporting a bicycle while stored or parked.

2. Description of the Prior Art

A wide variety of different types of bicycle racks have been proposed in the relatively crowded field of bicycle racks. U.S. Pat. No. 446,835, issued to J. W. Kennedy on Feb. 17, 1891, discloses a wooden rack comprising an integral piece provided with front and rear grooves dimensioned to receive front and rear wheels of a bicycle. U.S. Pat. No. 605,628, issued to R. D. Bradley on Jun. 14, 1898, discloses a bicycle rack comprising a generally rectangular channel bracket secured to a wooden post. After partial insertion of a bicycle wheel into the bracket, a user inserts a cross member behind the wheel rim to block retraction. U.S. Pat. No. 731,651, issued to J. J. Allen on Jun. 23, 1903, discloses a rack in the form of an integral wooden block provided on each of two opposite sides with a plurality of converging recesses each dimensioned to partially receive a bicycle wheel therein. U.S. Pat. No. 3,785,517, issued to W. D. Brajkovich on Jan. 15, 1974, discloses a motorcycle carrier for use in the bed of a pickup truck. The device includes an arcuate chock defining a channel dimensioned to receive a lower portion of a motorcycle wheel therein. U.S. Pat. No. 5,078,277 discloses a bicycle rack comprising a hollow plastic body including one or more arcuate recesses each dimensioned to receive a lower portion of a bicycle wheel therein. In use, the device is filled with water to provide sufficient weight to allow the rack to retain its position on a ground surface. U.S. Pat. No. Des. 260,248 discloses a bicycle storage rack including spaced sidewalls defining a central slot or channel dimensioned to receive a lower portion of a bicycle wheel therein. U.S. Pat. No. 4,662,617 discloses a support stand for a motorcycle comprising a pedestal like base provided with a plurality of tie down points for positive securement of the pedestal to the frame of a motorcycle. U.S. Pat. No. Des. 298,524, issued to J. A. De Luca on Nov. 15, 1988, discloses a bicycle storage unit comprising an elongated bracket including a pair of spaced parallel side walls defining a central channel. A plurality of aligned pairs of holes extend through the sidewalls. A retaining pin secured to the bracket against loss by a cord may be selectively inserted across the channel, through a selected aligned pair of holes. U.S. Pat. No. 5,246,120, issued to J. H. Walker on Sep. 21, 1993, discloses a bicycle rack including a pair of pivotally connected legs which form an L-shaped rack in an open configuration of the legs. The first and second legs are provided, respectively, with an elongated groove and an elongated slot, each dimensioned to receive an outer circumferential portion of a bicycle wheel therein. The device is intended for securement to a vertical surface such as a wall, to allow a bicycle to be stored in a generally vertically upright orientation.

Even though numerous different bicycle racks have been proposed in the prior art, several problems remain unsolved. For example, some of the disadvantages associated with the various racks disclosed in the above mentioned patents suffer include relatively high cost, inflexibility in mounting locations and configurations, and relatively bulky storage and shipping container requirements.

SUMMARY OF THE INVENTION

In a first aspect of the invention, a bicycle rack includes an open hollow construction, allowing a plurality of racks to be stored in nested stacked relation to minimize shipping and storage costs. In order to accomplish this objective, the rack in one illustrated embodiment of the invention includes a hollow body having diverging sidewalls. In another aspect of the invention, a bicycle rack includes provisions for mounting one or more racks in a variety of different configurations. In one example mounting configuration, the rack is secured to a vertical wall in order to provide for storage of a bicycle in a vertical orientation. In another example mounting configuration, one or more racks are mounted in free standing relation, or secured to a fixed object such as a wall, tree, post, etc. in order to store one or more bicycles in an upright orientation. In another aspect of the invention, a bicycle rack includes a tubular member adapted to receive a rope, cable, chain, or pipe for the purpose of mounting one or more racks in a fixed location. In another aspect of the invention, a bicycle rack includes at least one peripheral flange adapted for engagement with fasteners such as nails or screws for mounting the bicycle rack in a desired location. In another aspect of the invention, a bicycle rack includes at least one notch dimensioned and disposed for engagement with a 2×4 to facilitate mounting of one or more racks in a desired orientation and configuration. In another aspect of the invention, a bicycle rack includes a tubular member adapted to receive a cable or chain for locking a bicycle to the rack. In still another aspect of the invention, a bicycle rack comprises an open hollow shell construction provided with predetermined reduced and increased thickness portions to minimize weight and material while affording sufficient strength and rigidity.

In a particularly preferred embodiment of the invention, the above inventive aspects are all achieved in a single integral construction in which a generally L-shaped bicycle rack includes upper and lower intersecting leg portions, each including side walls having outwardly extending peripheral flanges adapted for optional engagement with fasteners such as nails or screws for the purpose of securing the rack in a selected location. An arcuate well disposed centrally in the rack receives an outer circumferential portion of a bicycle wheel to support a bicycle for storage purposes. Aligned pairs of notches in the peripheral flanges of the upper and lower legs allow one or more of the racks to be secured in a variety of different mounting configurations. In a first alternative, the rack may be secured to a vertical wall to store a bicycle in a vertical orientation. In a second alternative, a plurality of racks may be secured in sequential adjacent relation to form a rack for storing multiple bicycles. A tubular member extending transversely through the upper leg of the rack may receive cables or chains for locking a bicycle to the rack. Alternatively, one or more of the racks may be mounted in a selected location by passing a chain, cable, or pipe through the tubular member. The rack has a lightweight open hollow construction with diverging sidewalls which allows storage and shipping of a plurality of racks in nested stacked relation to minimize shipping and storage costs.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described preferred embodiments of the invention.

BRIEF DESCRIPTION OF THE DRAWINGS

FIG. 1 is a front perspective view of a rack especially adapted for use with bicycles according to the present invention;

FIG. 2 is a rear perspective view thereof;

FIG. 3 is a right side elevational view thereof;

FIG. 4 is a front elevational view thereof;

FIG. 9 is a partial perspective view illustrating the rack according to the present invention secured to a wall to store a bicycle in a generally vertical orientation.

FIG. 10 is a right side elevational view of the rack of the present invention, illustrating the use of wooden 2×4s to mount the rack in a selected position.

FIG. 11 is a front elevational view of the rack of the present invention, further illustrating the use of wooden 2×4s to mount the rack in a selected position.

FIG. 12 is a longitudinal cross sectional view taken along line 12—12 of FIG. 11.

FIG. 13 is a transverse cross-sectional detail view taken along line 13—13 of FIG. 12.

FIG. 14 is a front perspective view illustrating the use of wooden 2×4s to mount a plurality of racks accordingly to the present invention in adjacent sequential relation to form a rack for multiple bicycles.

FIG. 15 is a front perspective view illustrating the use of conventional pipe members and connectors to mount a plurality of racks according to the present invention in adjacent sequential relation to form a rack for multiple bicycles.

DETAILED DESCRIPTION OF THE PREFERRED EMBODIMENT(S)

Figure 6:
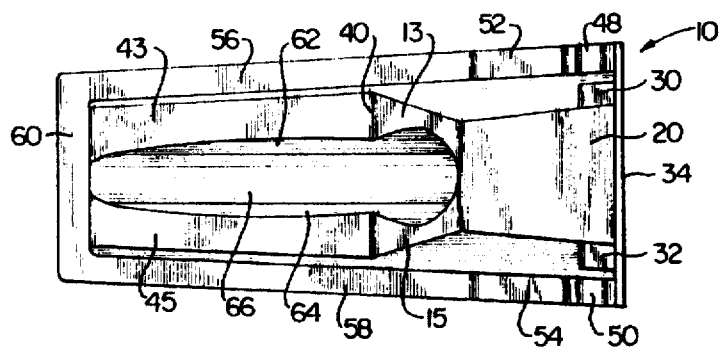
FIG. 6 is a top plan view thereof.
Figure 5:
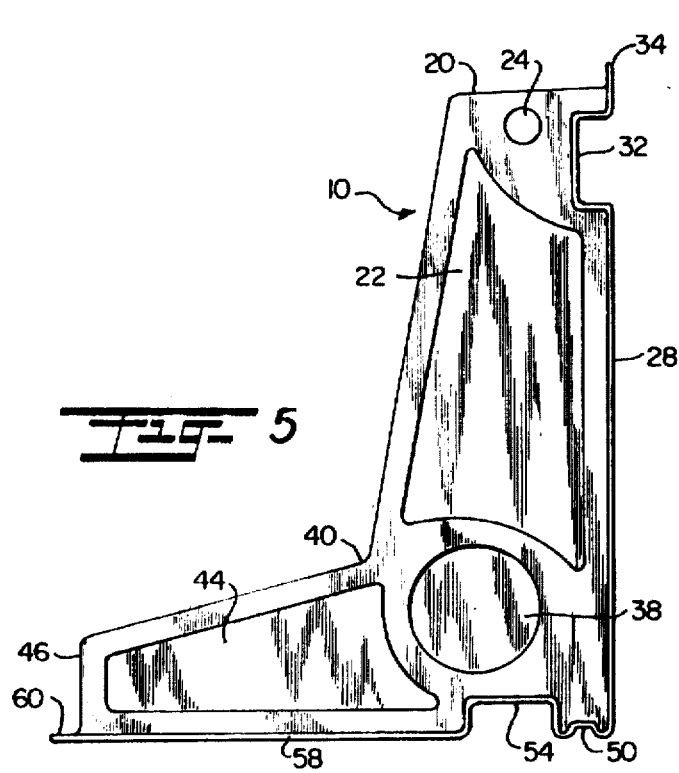
FIG. 5 is a left side elevational view thereof.

Referring now to the drawings, wherein like reference numerals designate corresponding structure throughout the views, and referring in particular to FIGS. 1 through 16, an improved rack 10 according to a preferred embodiment of the invention includes a generally L-shaped integral body member comprising an upper generally vertically extending leg 12 and a lower generally horizontally extending leg 14. An arcuate recess or well 16 formed substantially centrally in the rack 10 connects and extends substantially along the entire lengths of the legs 12 and 14. The well 16 is dimensioned and disposed for the receipt of a circumferential portion of a bicycle wheel therein, in the manner shown in FIG. 9.

The well or recess 16 substantially displaces a front face of the upper leg 12 of the rack 10, with the exception of a pair of inclined spaced parallel planar web portions 13 and 15 which extend along opposite sides of the well 16. The upper leg 12 includes a pair of spaced downwardly and rearwardly diverging side walls 18 and 22 spaced apart from the well 16 by the upper web portions 13 and 15. Each of the side walls 18 and 22 includes reduced thickness central portions to conserve material and reduce weight, while still retaining an adequate material thickness in edge regions and at the intersections of the legs 12 and 14 to afford a high degree of strength. A planar trapezoidal top surface 20 extends between and connects top edges of the side walls 18 and 20.

Figure 7:
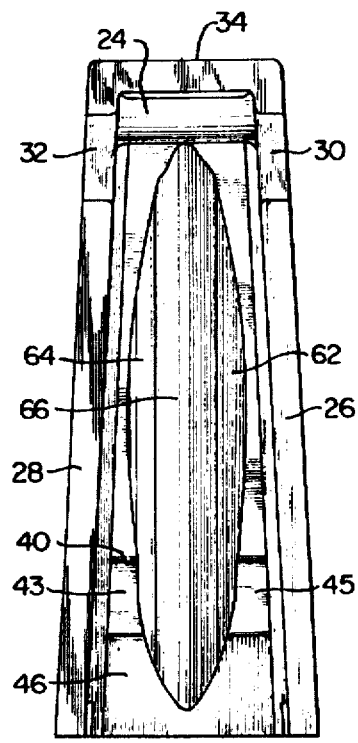
FIG. 7 is a rear elevational view thereof.
Figure 8:
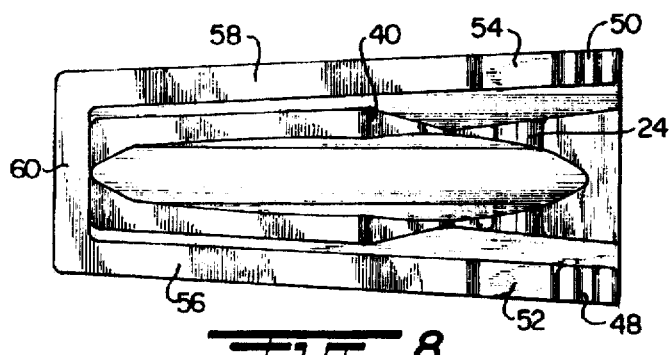
FIG. 8 is a bottom plan view thereof.

A hollow cylindrical tube 24 extends transversely through the upper leg 12, at a position slightly below the top surface 20 and slightly behind the uppermost extent of the well 16, for the purpose of attaching one or more of the racks 10 to a fixed object such as a post or tree. The tube 24 is best illustrated in FIGS. 7 and 12. Toward this end, an individual may pass a cable, rope, or chain through the tube 24 of one or more racks 10, and secure the cable, rope, or chain around a post, tree, or other fixed object. For example, a plurality of racks 10 may be positioned in a circular array around a post or tree and secured against displacement by passing a cable or chain through the tube 24 of each rack 10 in the array. Alternatively, two or more of the racks 10 may be mounted in adjacent sequential or juxtaposed relation, in a linear or nonlinear array, using conventional piping elements as shown in FIG. 15 (an alternative array mounting element). In this illustrated alternative mounting arrangement, a length of pipe P extends through the tubes 24 of a plurality of adjacent racks 10, thus forming a rack for the support and storage of a plurality of bicycles. The tube 24 may additionally or alternatively be employed by a user to secure a bicycle to the rack 10 by means of a conventional locking chain or cable type bicycle lock, in order to protect the bicycle against theft.

A pair of spaced downwardly diverging peripheral flanges 26 and 28 extend generally transversely outwardly from rear edge portions of respective side walls 18 and 22. An upper peripheral flange 34 extending transversely upwardly from a rear edge portion of the top surface 20 connects upper end portions of the flanges 26 and 28. A pair of aligned rectangular channel shaped notches 30 and 32 formed adjacent upper ends of the flanges 26 and 28 are dimensioned and disposed for engagement with a conventional wooden stud or 2×4, for the purpose of mounting the rack 10 in a fixed location or to mount a plurality of the racks 10 in a selected configuration, in a manner to be described subsequently in greater detail.

The side wall 18 and 22 include respective circular reduced thickness portions 36 and 38 at the junctions of the side walls 18 and 22 of the upper leg 12 with downwardly and rearwardly divergent side walls 42 and 44 of the lower leg 14. The reduced thickness portions 36 and 38 conserve material and reduce weight, while surrounding increased thickness portions afford sufficient strength and rigidity.

An upper face portion of the lower leg 14 includes downwardly converging, spaced generally trapezoidal web portions 43 and 45 disposed on opposite sides of the central well 16. Upper edges of the webs 43 and 45 intersect the webs 13 and 15 along a line of intersection 40, which generally defines the intersection of the upper leg 12 with the lower leg 14 of the rack 10. A trapezoidal front surface 46 of the lower leg 14 extends between and connects the lower leg side walls 42 and 44 and front edges of the surfaces 43 and 45.

A pair of spaced forwardly converging peripheral flanges 56 and 58 extend transversely outwardly from bottom edge portions of the lower leg side walls 42 and 44, respectively. A front peripheral flange 60 extends transversely between and connects front end portions of the flanges 56 and 58. An aligned pair of ribbed feet 48 and 50 formed in the flanges 56 and 58 adjacent respective corner intersections with the flanges 26 and 28 form reinforced support surfaces for abutment with the ground or other support surface. The flanges 56 and 58 also include aligned rectangular notches 52 and 54 dimensioned and disposed for engagement with a wooden stud or other support, such as, a conventional 2×4. FIGS. 9, 10, 11, and 14 illustrate the use of 2×4s L to secure the rack 10 in a desired location and/or to secure a plurality of racks 10 in a selected configuration to form a rack for multiple bicycles. For example, as shown in FIG. 9, a single 2×4 L may be disposed in the notches 30 and 32 of the upper leg 12, and secured to a vertically extending wall R of a room or building. Screws S may be installed through the flange regions of the notches 30 and 32, through the 2×4 L, and into the wall R in order to secure the rack 10 in position, with the flanges 26, 28, and 34 abutting the surface of the wall R. In this mounting configuration, a user may store a bicycle in a generally vertical orientation by manipulating the handlebars H of a bicycle to dispose the front wheel W of the bicycle partially within the well 16.

FIGS. 10, 11, and 14 illustrate an alternative mounting configuration in which a pair of 2×4s L define supports or securing members which extend through both of the aligned pairs of notches 30, 32 and 52,54 of one or more racks 10. In this arrangement, the 2×4s L may be secured to a wall, a floor, or to the ground, or may be left free-standing. In conjunction with mounting of one or more of the racks 10, fasteners such as nails, screws, staples, adhesives, etc., may be applied to any one or more of the flanges 26, 28, 34, 56, 58, and 60 and also to any one or more of the notches 30, 32, 52, and 54.

The well or recess 16 includes inwardly converging side walls 62 and 64 connected by an arcuate back wall 66. As can be appreciated from FIGS. 2 and 7, the well 16 partially occupies a hollow region disposed between the side walls 18, 22 and 42, 44. A lower front edge portion of the well 16 includes a reduced width notch 68 formed centrally in the upper edge of the face 46. The notch 68 facilitates insertion of a bicycle wheel into the well 16, while also affording a sufficient degree of resistance to prevent the bicycle wheel from unintentional dislodgment from the well 16.

Figure 16:
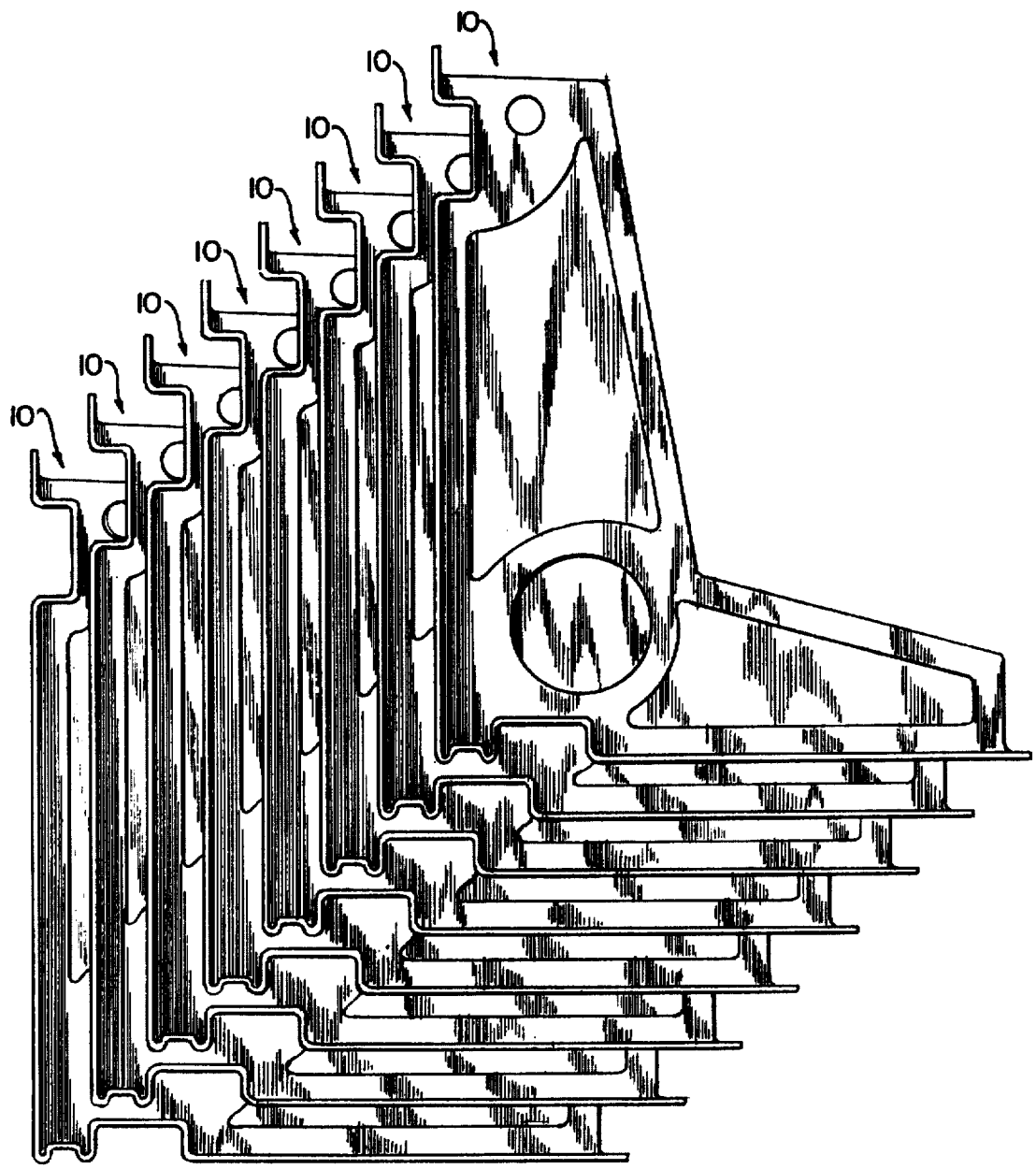
FIG. 16 is a right side elevational view illustrating a plurality of racks according to the present invention stored in nested stacked relation.

Thus, the rack 10 of the present invention provides an inexpensive, lightweight rack which affords many different mounting arrangements and configurations. Additionally, a plurality of the racks 10 of the present invention may be stored or shipped in a restable (capable of being inserted within each other) and stackable (capable of easy storage) relation as shown in FIG. 16, thus minimizing shipping and storage costs. It should be noted that the non-parallel diverging relationships of the side wall pairs 18, 22; 38, 42; and 62, 64 constitutes one important aspect of the invention, in that this construction facilitates the nested stacking shown in FIG. 16. As shown in FIG. 16 in light of FIG. 12, the wells may also be restable. To better understand the diverging relationship of the side wall pairs 18, 22 and 38, 42, it is helpful to note that both pairs of side walls have a maximum separation in the bottom rear corner region of the rack 10, adjacent the ribs 48 and 50.

The rack 10 is preferably molded from a plastic material, which may include suitable pigments to produce racks 10 in a wide variety of different colors. In addition to plastics, other materials such as sheet metal, carbon composites, fiberglass, etc., may also be employed.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A rack for use with bicycles, comprising:

an integral body of open hollow construction including upper and lower legs with spaced rearwardly diverging side walls interconnected in a generally L-shaped configuration;

an arcuate well dimensioned to receive an outer circumferential portion of a bicycle wheel, said well disposed substantially centrally of said upper and lower legs and disposed in a hollow region between said diverging sidewalls such that a plurality of said racks may be stored in nested stacked relation;

web portions extending between front faces of said upper and lower legs and said well;

tubular member receiving means extending transversely through upper ends of said upper and lower legs for receipt of a securing member in securing one or more of said racks in a selected location and configuration and for the purpose of securing a bicycle to said rack; and a first peripheral flange extending around said upper leg and a second peripheral flange extending around said lower leg, said first and second peripheral flanges disposed in two substantially perpendicular planes and each including at least one pair of aligned notches dimensioned and disposed for receiving a securing member for mounting said rack in a desired location.

2. The rack of claim 1, wherein said well includes a pair of inwardly converging sidewalls connected at inner ends by a back wall.

3. The rack of claim 1, wherein said rack is integrally molded from a plastic material.

4. The rack of claim 1, further comprising a vertical wall mounting element to mount said rack to a vertical wall.

5. The rack of claim 1, further comprising an array mounting element to mount a plurality of said racks in sequential adjacent, juxtaposed relation to form an array to store multiple bicycles.

6. The rack of claim 5, wherein said array is linear.

7. The rack of claim 6, wherein said array is circular.

* * * * *